R. P. JACKSON.
CURRENT RECTIFIER SYSTEM.
APPLICATION FILED NOV. 8, 1911.
1,182,685.
Patented May 9, 1916.
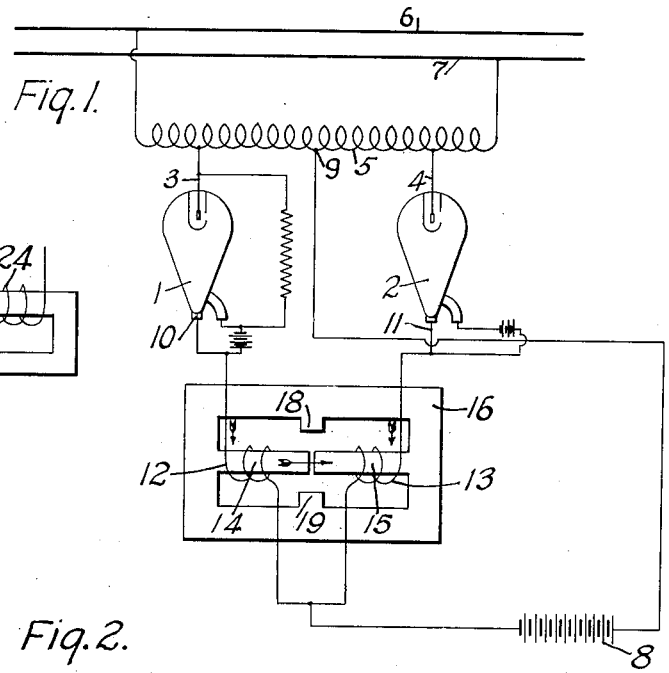
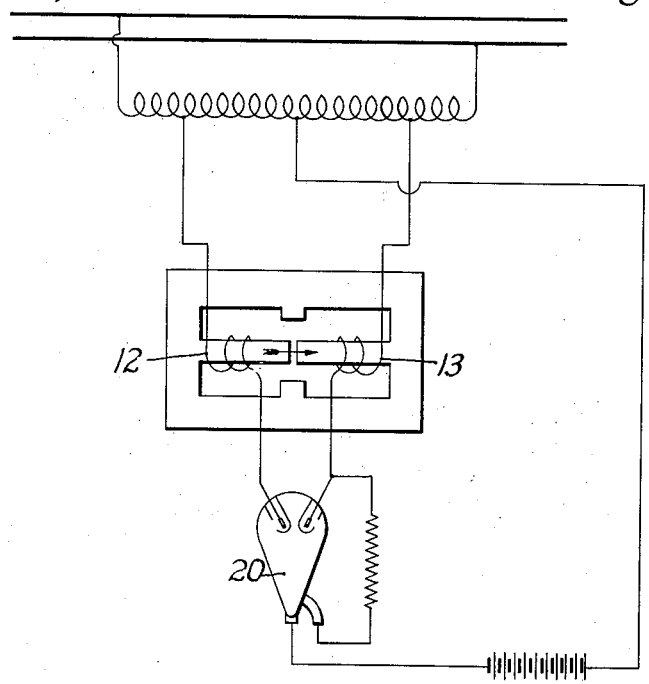
WITNESSES:
INVENTOR
Ray P. Jackson
BY
Wesley G. Carr
ATTORNEY

United States Patent Office.

RAY P. JACKSON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

CURRENT-RECTIFIER SYSTEM.

1,182,685.  Specification of Letters Patent.  Patented May 9, 1916.

Application filed November 8, 1911. Serial No. 659,240.

*To all whom it may concern:*

Be it known that I, RAY P. JACKSON, a citizen of the United States, and a resident of Edgewood Park, in the county of Allegheny and State of Pennsylvania, have invented a new and useful Improvement in Current-Rectifier Systems, of which the following is a specification.

My invention relates to apparatus for rectifying alternating current, and it has for its object to provide means for materially limiting the current that follows a short circuit in mercury-vapor or other current-rectifying apparatus, in order to avoid injury that might otherwise result to the apparatus.

According to the present invention, the inductive resistance opposed to the flow of short-circuit current is so high as to substantially prevent the occurrence of the short-circuits themselves, while only sufficient inductive resistance is opposed to the normal flow of current to serve as sustaining means.

My invention is illustrated in the accompanying drawing, Figure 1 of which is a diagrammatic view of a current-rectifier system embodying the same, Fig. 2 is a similar view of a modification of the system of Fig. 1; and Fig. 3 is a diagrammatic view of a modified form of the inductive resistance member employed in the systems of Fig. 1 and of Fig. 2.

In Fig. 1, two mercury-vapor or other suitable current-rectifying devices 1 and 2 that are respectively traversed by alternate half waves of the alternating current to be rectified, have their anodes 3 and 4 respectively connected to a winding 5 of an auto transformer at or near its extremities, the said transformer being supplied with alternating current from a circuit 6—7. The rectified current is supplied to a battery 8, or to any other suitably receiver of direct current, one terminal of which is connected to the middle or another suitable intermediate point 9 of the auto transformer winding 5.

Including in the connections between the cathode leads 10 and 11 of the rectifiers and the other terminal of the battery, are two windings 12 and 13, respectively, that surround opposing inwardly-projecting main pole-pieces 14 and 15 of an inductive device, the yoke of the core 16 of which is in the form of a hollow rectangle. The opposing free ends of the pole-pieces 14 and 15 are separated by a comparatively short air gap, and the windings 12 and 13, which are traversed by alternate half-waves of current, are arranged to supplement each other under normal conditions of operation, that is, to produce fluxes in the same direction through the pole-pieces 14 and 15. Extending inwardly from the sides of the yoke of the core of the inductive device, and opposite to the free ends of the pole-pieces 14 and 15, are two shorter auxiliary poles or projections 18 and 19 that are separated from the free ends of the main poles by a greater distance than the said poles are separated from each other, in order that a large amount of leakage may not normally occur from the main poles to the auxiliary poles.

In the operation of the system, alternate half-waves of the alternating current traverse the rectifying devices 1 and 2 and the coils 12 and 13, and both half waves traverse the battery 8. As before stated, the currents traversing the coils 12 and 13 produces fluxes in the inductive device in the same direction, and, since the air gap between the pole pieces 14 and 15 is short, the said device introduces a sufficient amount of inductance into the circuit under normal conditions, to sustain the rectified current. However, the air gap is not so short that a large amount of reactance is opposed to the normal flow of current. If a short circuit occurs in the system at all, the short-circuit current must necessarily travel between the rectifying devices through the coils 12 and 13, it being reversed from its normal direction of flow alternately in the said coils. Under this condition the coils continuously oppose each other, rather than supplement each other; that is, they produce fluxes in opposite directions in the pole pieces 14 and 15, and the opposing fluxes traverse the air gaps between the ends of pole-pieces 14 and 15 and the pole-pieces 18 and 19. The coils 12 and 13, therefore, constitute separate and cumulative inductive devices, so that a large amount of inductance is thus interposed in the circuit through which short circuit currents must flow, if at all, and its opposition to the flow of short-circuit current is so great as to substantially prevent the occurrence of the short circuits themselves.

In the system of Fig. 2, only a single current-rectifying device 20 is employed, and the coils 12 and 13 of the inductive devices are included in the connections between the auto transformer and the anodes of the rectifier, they being thus traversed by alternate half waves of the alternating current. The operation of the system of Fig. 2 is substantially the same as that of Fig. 1.

Fig. 3 shows a modified form of the inductive device having a core structure 22 in the form of a hollow rectangle with both windings 23 and 24 upon one side thereof arranged to normally produce fluxes in the core in the same direction. In case of a short circuit in the system the windings oppose each other and cause a leakage flux between the sides or legs of the core structure.

While the invention has been shown and described as employed in connection with mercury-vapor current-rectifying devices, it will be understood that it is not limited in its application to such specific use, but may be employed in connection with other rectifiers without departing from the spirit of the invention.

I claim as my invention:

1. An inductive device comprising a core having two main opposing poles and auxiliary poles adjacent to the free ends of the main poles but separated therefrom a greater distance than the said main poles are separated from each other, and two normally supplementary windings respectively upon the main poles.

2. The combination with a source of alternating current, and current-rectifying apparatus, of an inductive device comprising a core having two main opposing poles and auxiliary poles adjacent to the free ends of the main poles but separated therefrom a greater distance than the said main poles are separated from each other, and two normally supplementary windings respectively upon the main poles and traversed by alternate half-waves of the alternating current.

In testimony whereof, I have hereunto subscribed my name this 31st day of Oct., 1911.

RAY P. JACKSON.

Witnesses:
C. E. STEPHENS,
B. B. HINES.